US006837645B2

(12) United States Patent
Kanatani et al.

(10) Patent No.: US 6,837,645 B2
(45) Date of Patent: Jan. 4, 2005

(54) VEHICLE WINDOW GLASS HOLDER

(75) Inventors: Yasukazu Kanatani, Osaka (JP); Katsumi Magara, Osaka (JP); Atsushi Ogawa, Yokohama (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 10/239,660

(22) PCT Filed: Feb. 22, 2001

(86) PCT No.: PCT/JP01/01286

§ 371 (c)(1),
(2), (4) Date: Sep. 24, 2002

(87) PCT Pub. No.: WO01/98614

PCT Pub. Date: Dec. 27, 2001

(65) Prior Publication Data

US 2003/0077117 A1 Apr. 24, 2003

(30) Foreign Application Priority Data

Jun. 19, 2000 (JP) ....................................... 2000-182859

(51) Int. Cl.[7] ............................................... B25G 3/00
(52) U.S. Cl. .................... 403/348; 403/349; 403/408.1; 403/234; 403/235; 403/290
(58) Field of Search .......................... 49/372, 374, 375, 49/348; 403/348, 349, 408.1, 111, 329, 330, 234, 235, 290

(56) References Cited

U.S. PATENT DOCUMENTS 4,943,179 A    7/1990   Horiki et al.
6,615,546 B2 * 9/2003   Furuyama et al. ............ 49/502

FOREIGN PATENT DOCUMENTS

DE        35 35 719        9/1986

OTHER PUBLICATIONS

International Search Report, Oct. 9, 2001.

* cited by examiner

*Primary Examiner*—Daniel P. Stodola
*Assistant Examiner*—Victor MacArthur
(74) *Attorney, Agent, or Firm*—RatnerPrestia

(57) ABSTRACT

A vehicle window glass holder is disclosed, which is capable of easily fixing a window glass only by rotating a shaft, and easily extracting the shaft by reversely rotating the shaft to allow reuse. The holder comprises a holding member and a shaft. The shaft includes projecting pieces provided on its tip, a support portion for supporting the projecting pieces, and a main body connected to the support portion. The holding member includes a pair of opposing pieces, and each of the opposing pieces has an shaft inserting hole. The shaft is inserted into the holes of the holding member. By rotating the shaft, the shaft is engaged with the holding member, and thus the shaft is prevented from being extracted from the holding member.

10 Claims, 22 Drawing Sheets

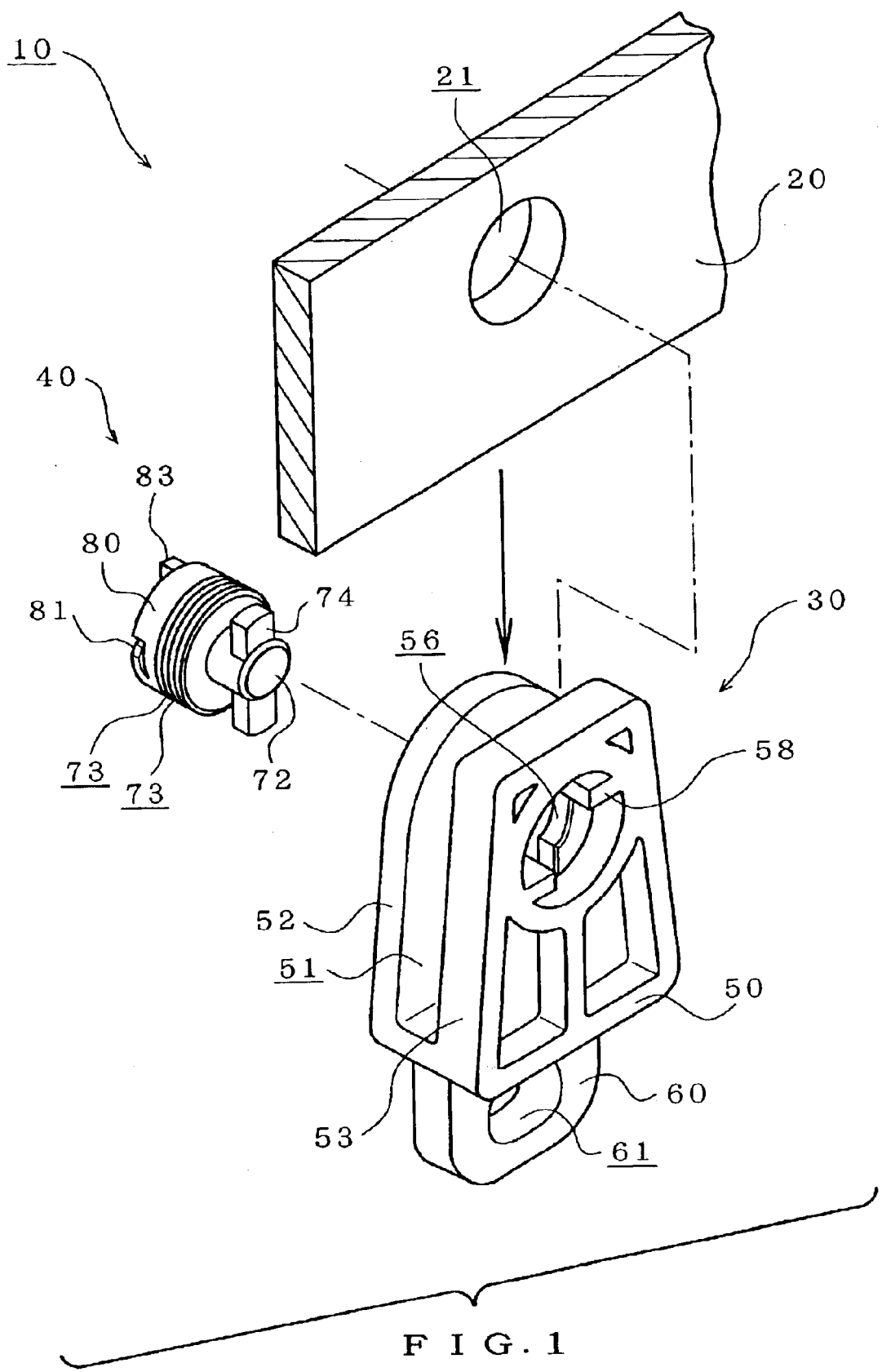
F I G. 1

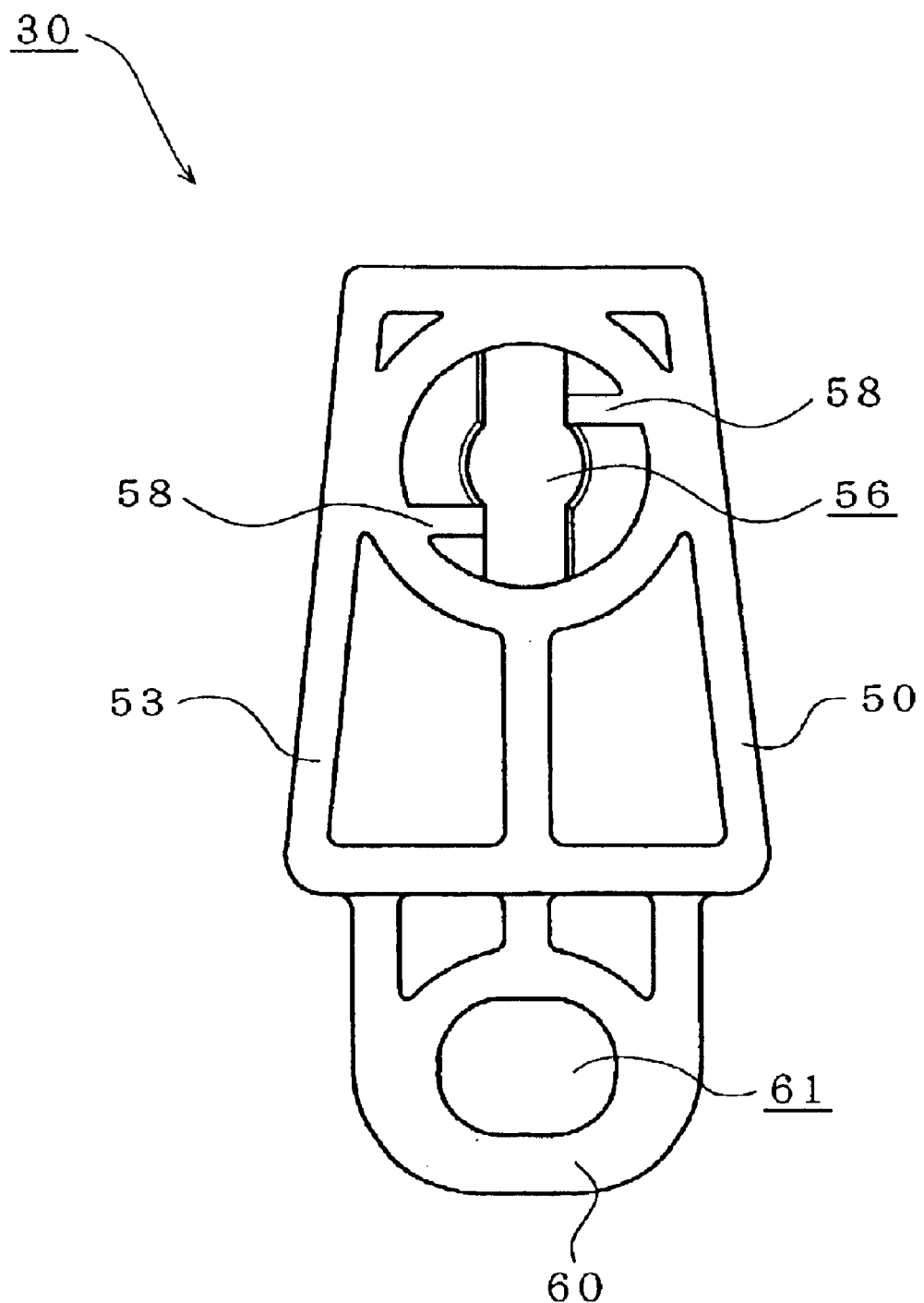
F I G. 5

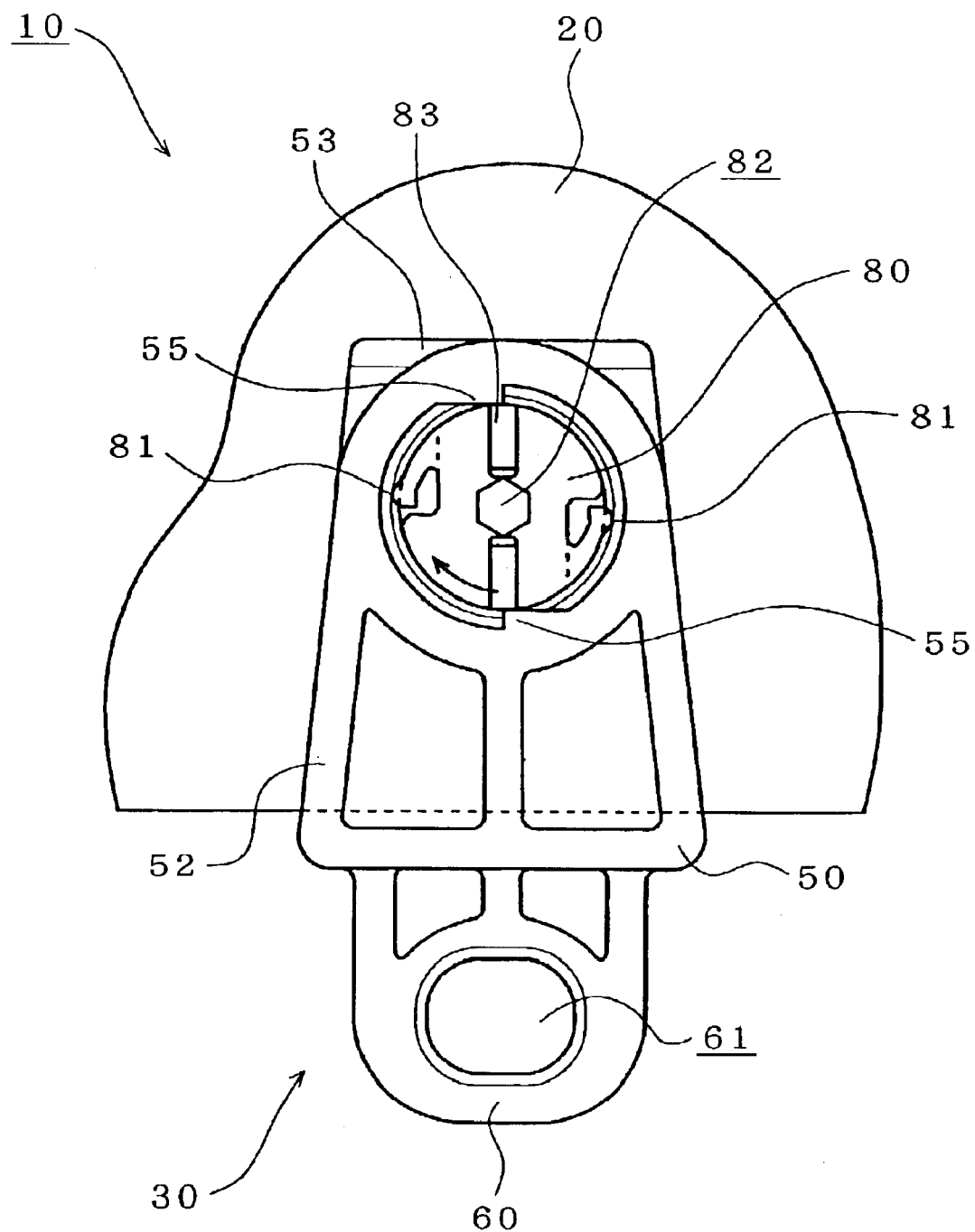
F I G. 1 2

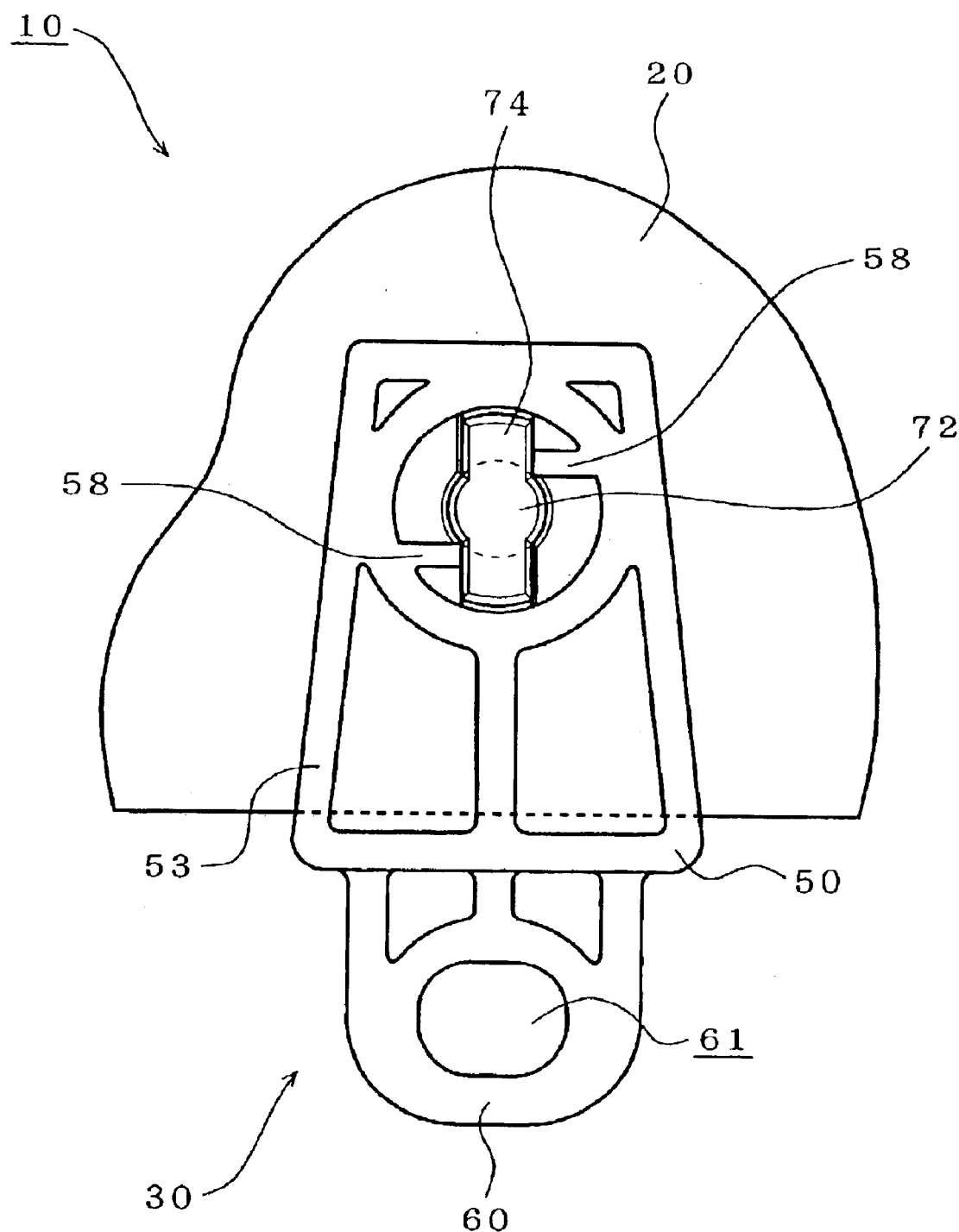
F I G. 13

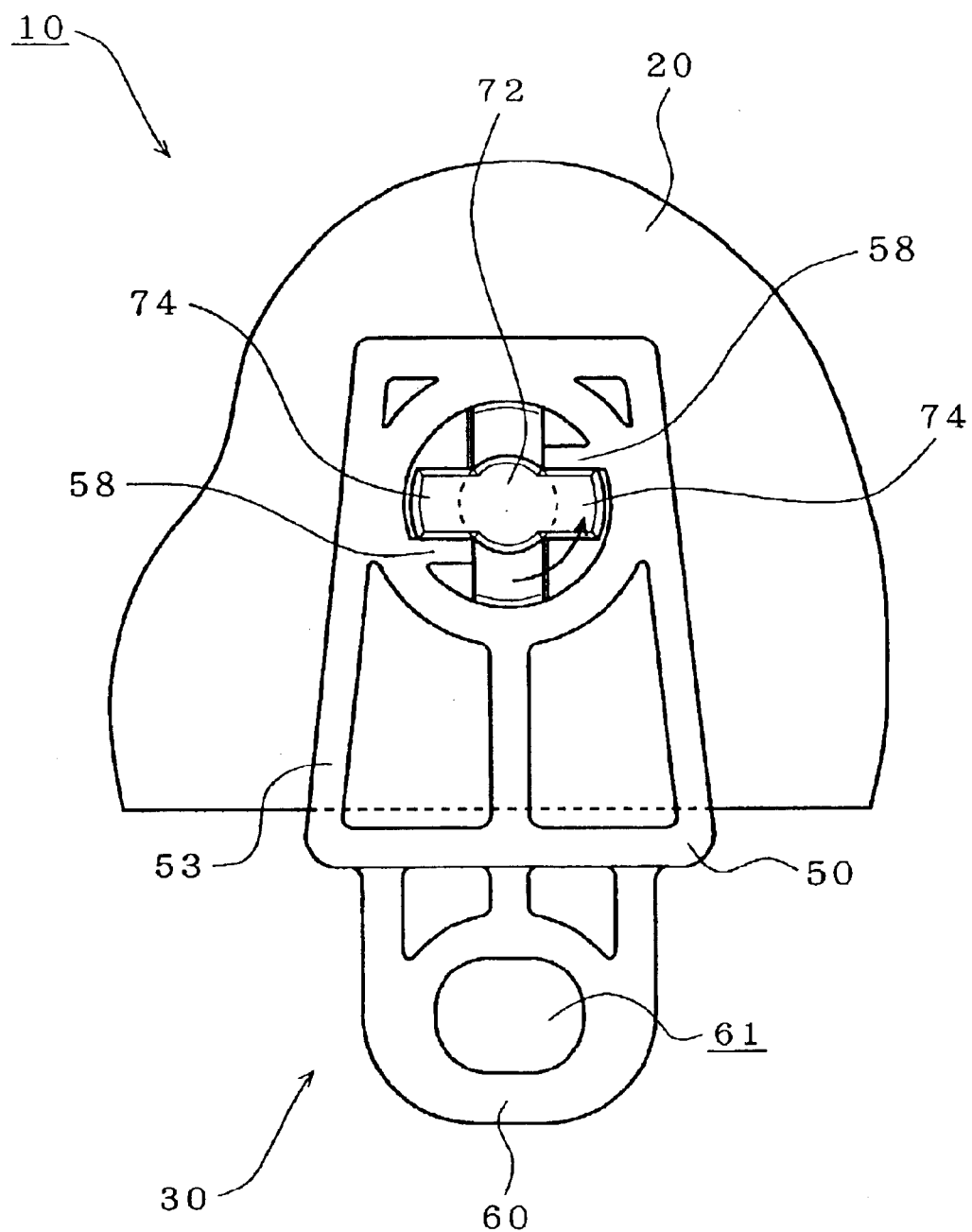
F I G. 15

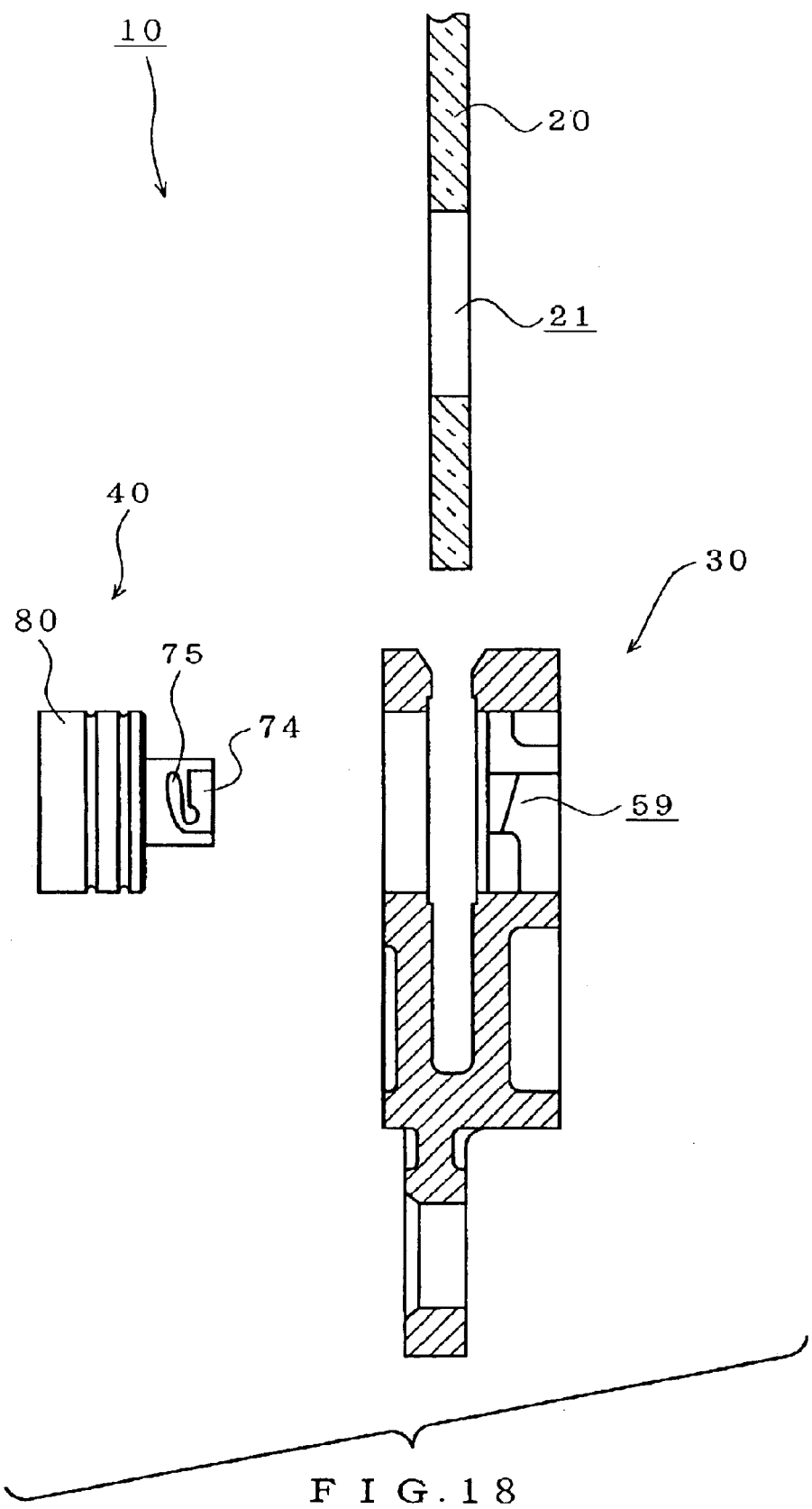
F I G. 18

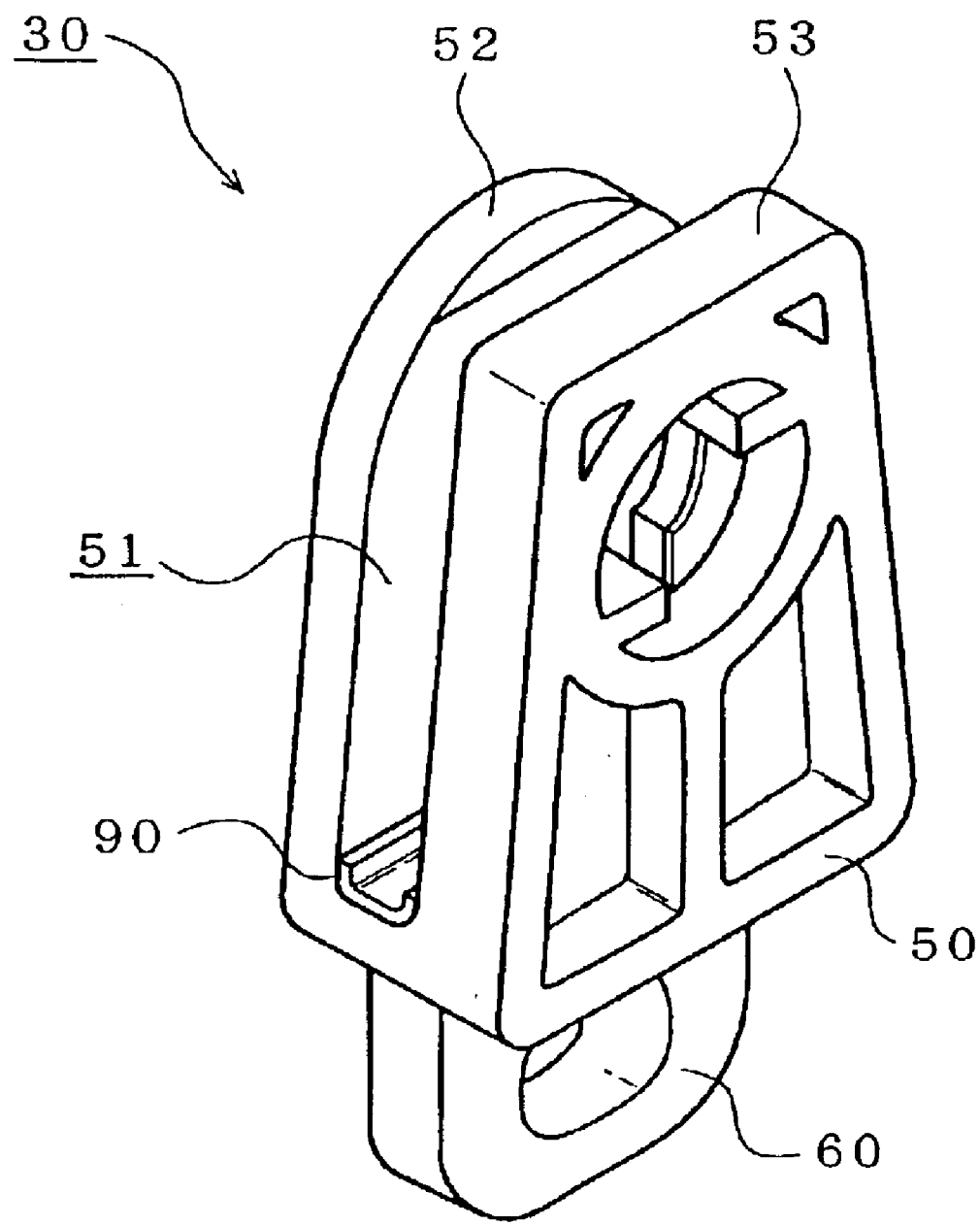
F I G. 2 1

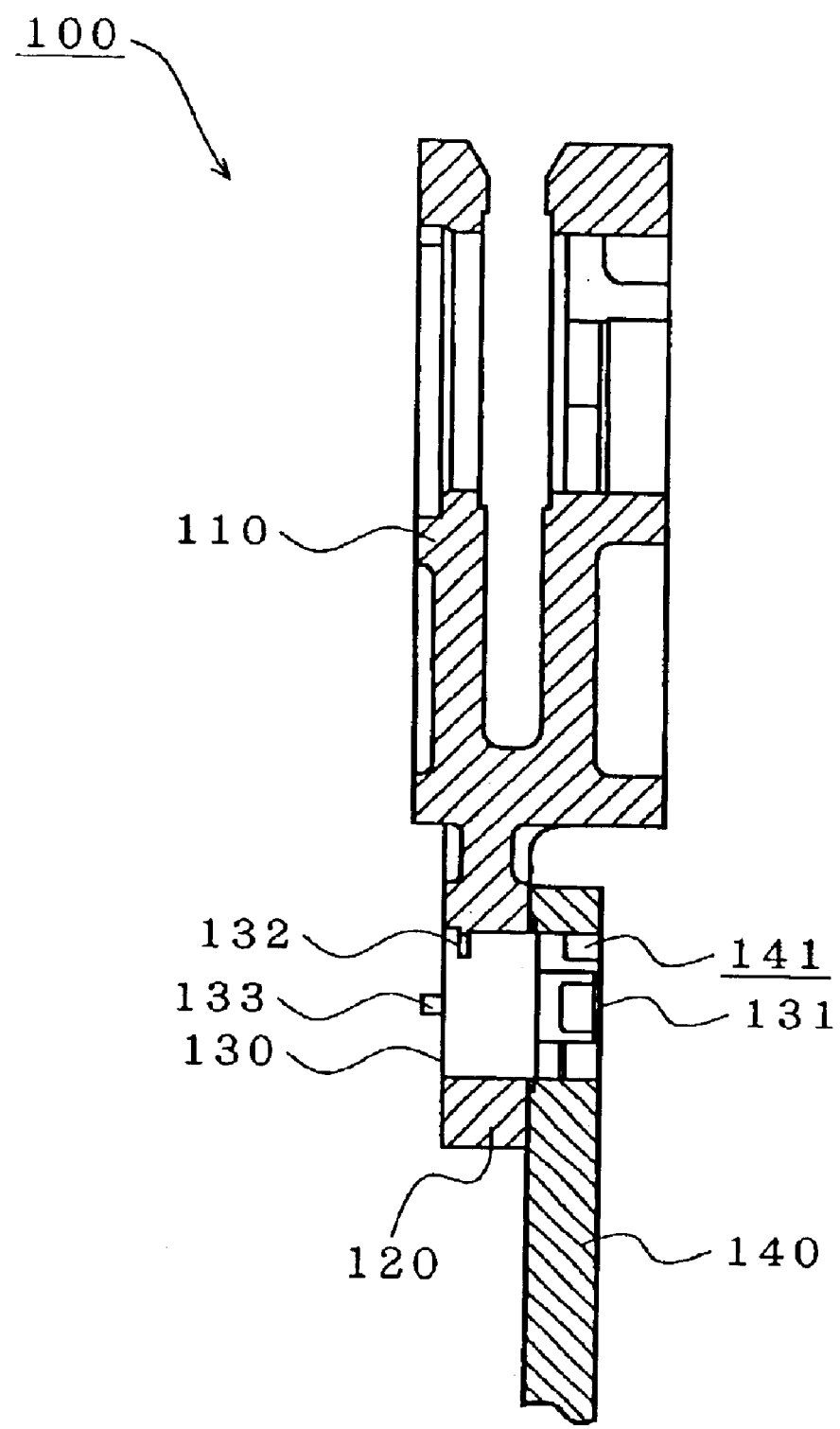
F I G. 2 3

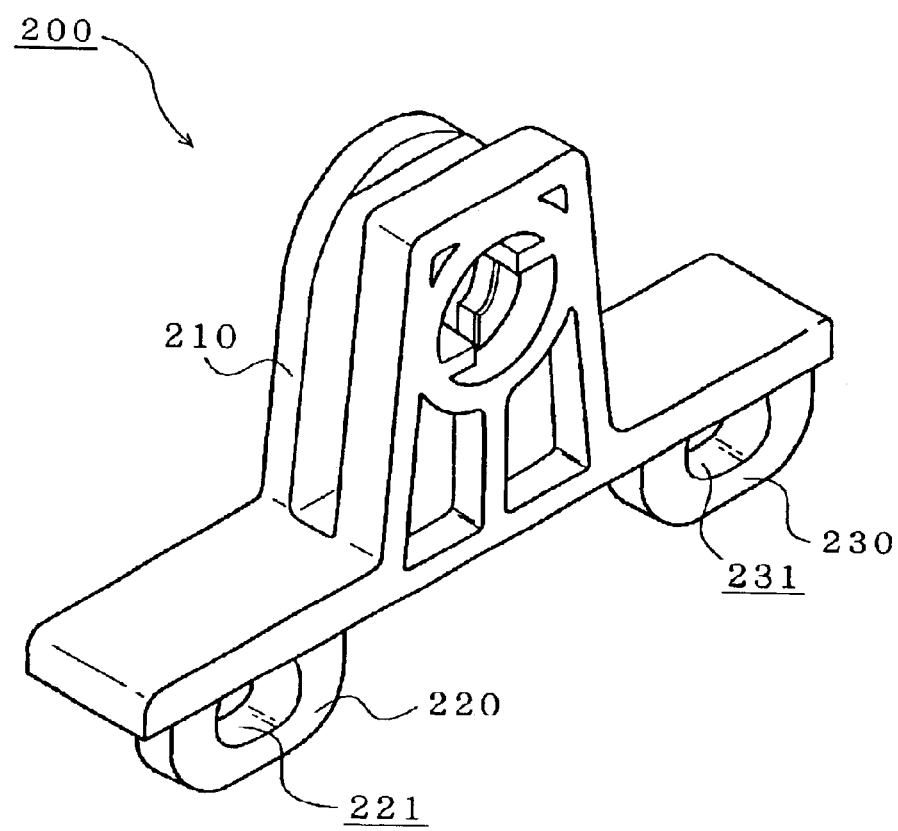
F I G. 24
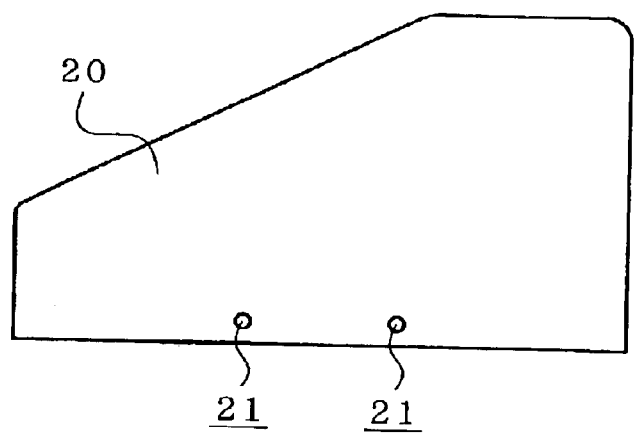
F I G. 25

VEHICLE WINDOW GLASS HOLDER

TECHNICAL FIELD

The present invention relates to a vehicle window glass holder and, more particularly, to an attaching structure of a window glass.

BACKGROUND ART

The holder is designed to hold, for example the window glass of an automobile, connected to a window regulator mechanism incorporated in a door, and is elevated/lowered while holding the window glass. One of such vehicle window glass holders available in the conventional art has been known in Japanese Utility Model Publication No. 54-38648 titled in "ELEVATING/LOWERING DEVICE ATTACHING STRUCTURE FOR AUTOMOBILE WINDOW GLASS".

The conventional attaching structure disclosed in the above Publication includes an attaching hole formed in a window glass. The window glass is fixed through a rivet to the attaching hole. The rivet is composed of tube-like and shaft-like members. The shaft-like member is pulled to cut the tube-like member by its blade, and the wide-open part of the tube-like member is radially opened.

However, such conventional attaching structure, where the tube-like member is cut by the blade of the shaft-like member to be radially opened, results in the difficulty of removing the rivet. In addition, with regard to the rivet, there is a problem of easy breakage of the window glass, which is caused by the abutment of the inner peripheral surface edge of the attaching hole to the rivet when a load is applied to the window glass.

Another conventional window glass holder is a type of adhesive one. Such holder is difficult to be detached away from the window glass because of its strong adhesive strength thereto. Therefore, there is a problem in that the holder may not be reused and the window glass may not only be reused itself but also be recycled as cullet.

DISCLOSURE OF INVENTION

It is an object of the present invention to provide a holder, comprising a shaft and a holding member, and capable of easily fixing a window glass to the holding member only by rotating the shaft, and capable of easily extracting the shaft from the holding member by reversely rotating the shaft, the shaft and the holding member being able to be reused.

It is another object of the invention to provide a holder capable of preventing the breakage of a window glass when a load is applied thereto.

In accordance with the invention, a vehicle window glass holder comprises a holding member for holding a vehicle window glass having a through-hole provided therein, and a shaft for fixing the inserted window glass to the holding member. The shaft includes projecting pieces provided on its tip, a support portion for supporting the projecting pieces, and a main body connected to the support portion. The holding member includes a pair opposing pieces, a portion into which the window glass is inserted being formed therebetween. One of opposing pieces has a first hole into which the main body of the shaft is inserted, and the other of opposing piece has a second hole into which the projecting pieces and support portion are inserted. The shaft is inserted from the first hole of one of opposing pieces through the through-hole of the window glass to the second hole of the other of opposing pieces so as to hold the window glass by the main body.

The holder further comprises a extraction preventing mechanism for preventing the shaft from being extracted when the shaft is rotated.

The holder can further comprise a mechanism for preventing the reverse rotation of the shaft when the shaft is rotated.

According to the holder of the present invention, at the outer peripheral surface of the main body of the shaft, two recessed grooves are provided each thereof is oppositely to and away from the inner peripheral edge of the through-hole of the window glass.

According to the holder of the present invention, a buffer member may be fixed to the bottom surface of the window glass inserting portion of the holding member.

Furthermore, according to the holder of the present invention, the holding member further includes at least one connecting portion to be connected to an elevating/lowering device for elevating/lowering the window glass.

BRIEF DESCRIPTION OF DRAWINGS

FIG. 1 is an exploded perspective view of a holder.

FIG. 5 is a right side view of the holding member.

FIG. 12 is a left side view of the holder set at an unlocking position of the shaft.

FIG. 13 is a right side view of the holder set at the unlocking position of the shaft.

FIG. 15 is a right side view of the holder set at the locking position of the shaft corresponding to FIG. 13.

FIG. 18 is an exploded perspective view of a holder according to a second embodiment of the invention.

FIG. 21 is a perspective view showing an assembled state of FIG. 17.

FIG. 23 is a perspective view showing an assembled state of FIG. 20.

FIG. 24 is a perspective view of a holding member in a fifth embodiment of the invention.

FIG. 25 is a side view of a window glass.

BEST MODE FOR CARRYING OUT THE INVENTION (First Embodiment)

Figure 2:
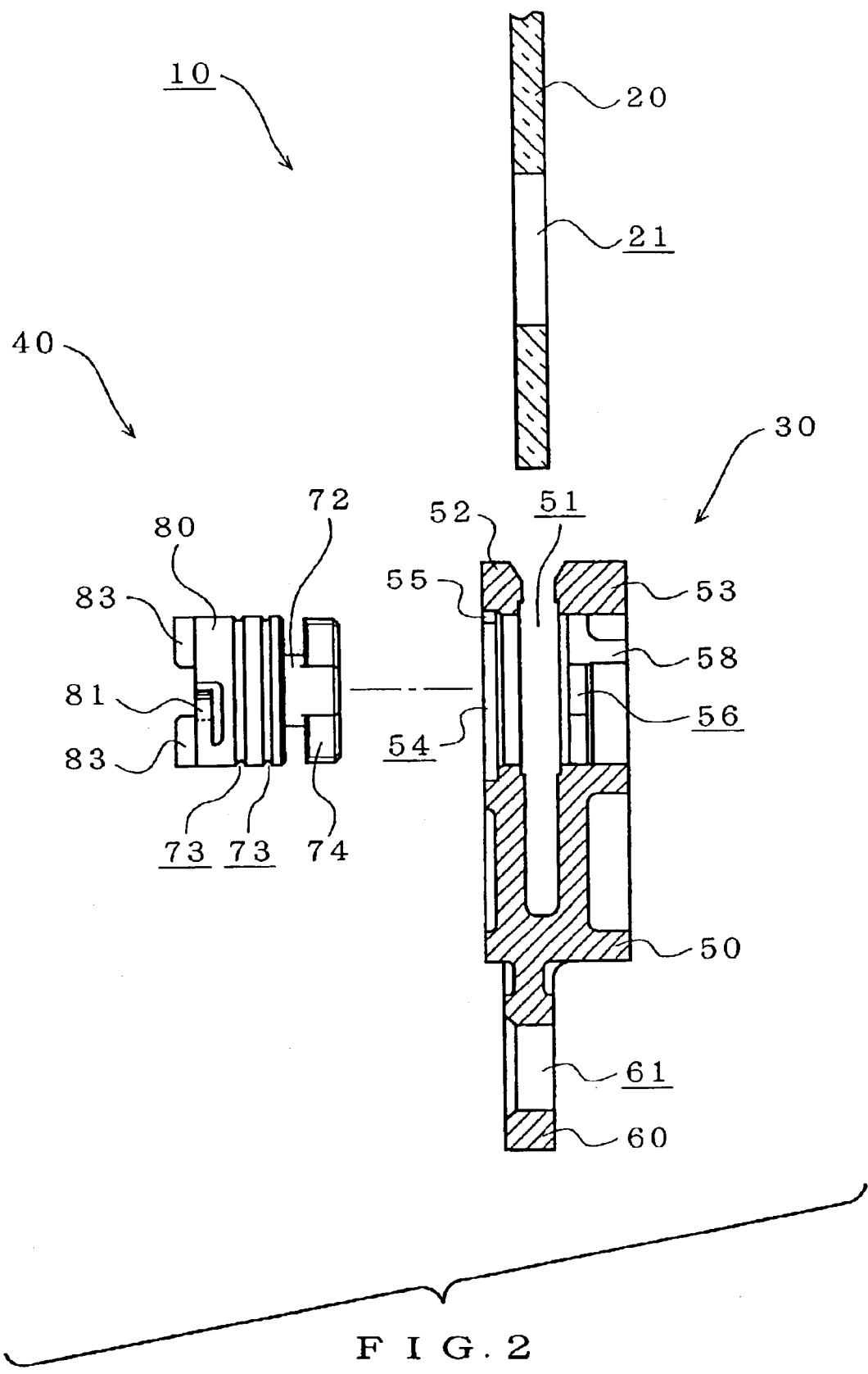
FIG. 2 is an exploded sectional view of the holder of FIG. 1.
Figure 3:
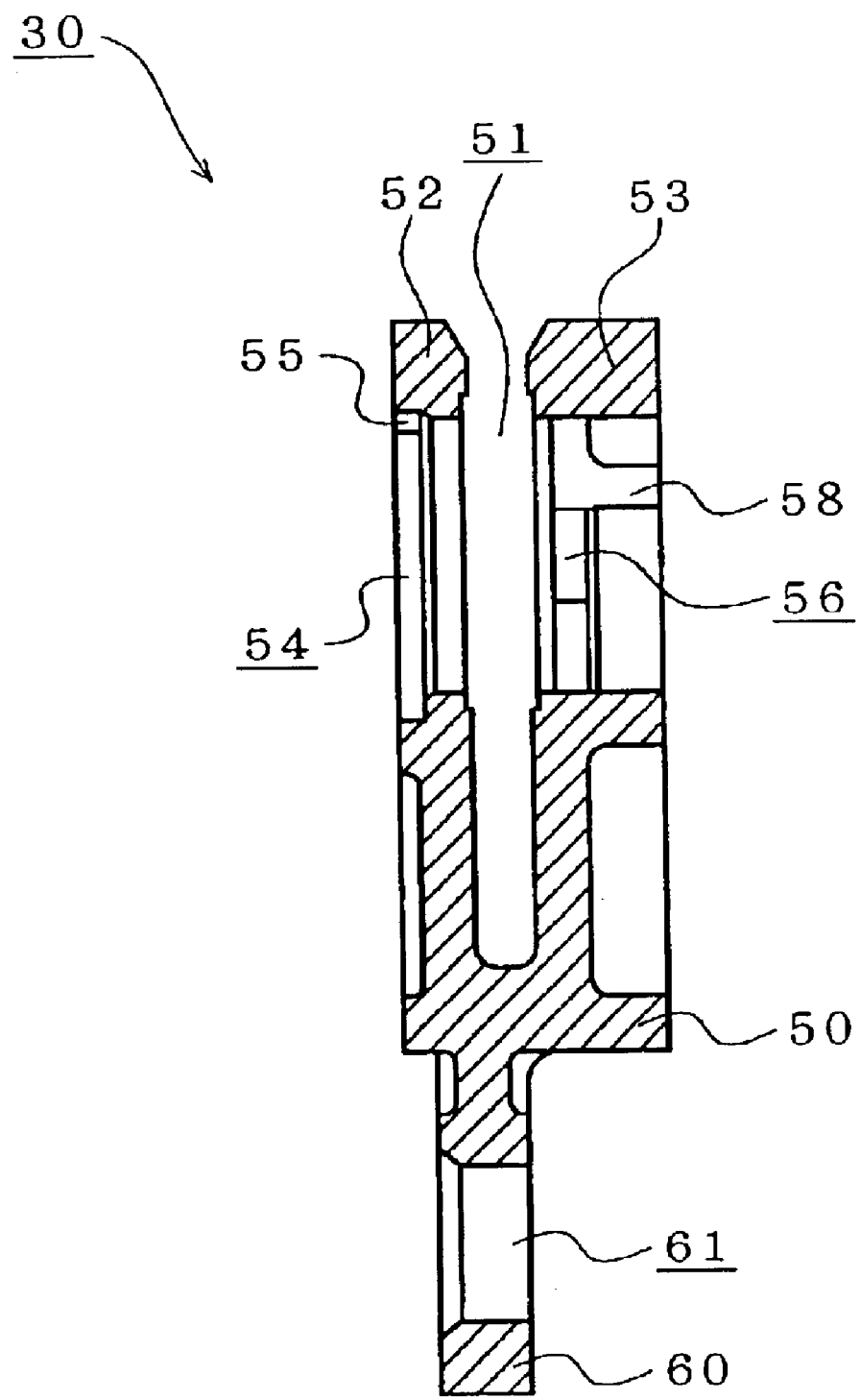
FIG. 3 is a vertical sectional view of a holding member.

Now, description will be made of a holder according to a first embodiment of the present invention with reference to FIGS. 1 to 16. As shown in FIGS. 1 and 2, a holder 10 comprises a holding member 30 and a shaft 40. As shown in FIGS. 1 to 3, the holding member 30 includes portion 51 into which a window glass 20 is inserted (referred to as a window glass inserting portion hereinafter). As shown in FIGS. 3 to 7, the holding member 30 also includes a main body 50, and a connecting portion 60. Such holding member 30 is integrally formed by using a thermoplastic resin, for example, nylon, having proper rigidity.

As shown in FIGS. 1 and 2, the shaft 40 is designed to fix the window glass 20 in the window glass inserting portion 51 of the holding member 30. As shown in FIGS. 8 to 11, the shaft 40 includes two projecting pieces 74 provided on its tip, a support portion 72 for supporting the projecting pieces, and a main body 80. Such shaft 40 is integrally formed by using a thermoplastic resin, for example, POM (polyoxymethylene), having proper elasticity and rigidity.

Each of the projecting pieces 74 is a rectangular parallelepiped in shape, and the projecting pieces are radially extended in two directions from the outer peripheral surface of the tip of the support portion 72. The support portion 72 is cylindrical in shape, and connected to the main body 80 formed so as to be roughly cylindrical in shape.

Figure 8:
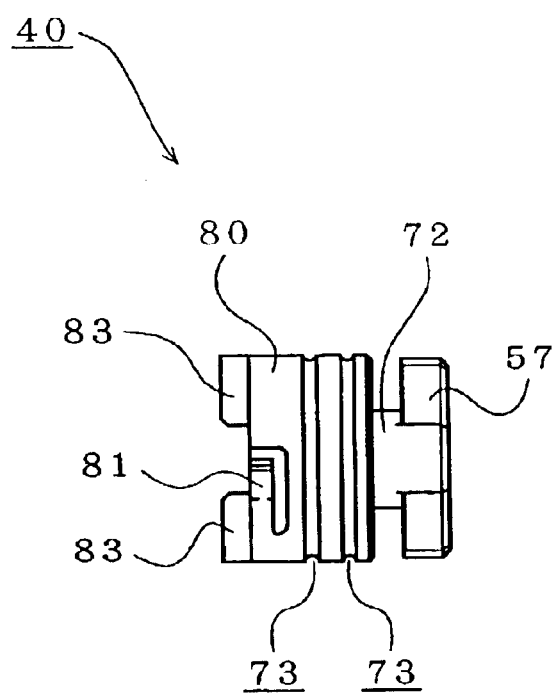
FIG. 8 is a front view of a shaft.
Figure 16:
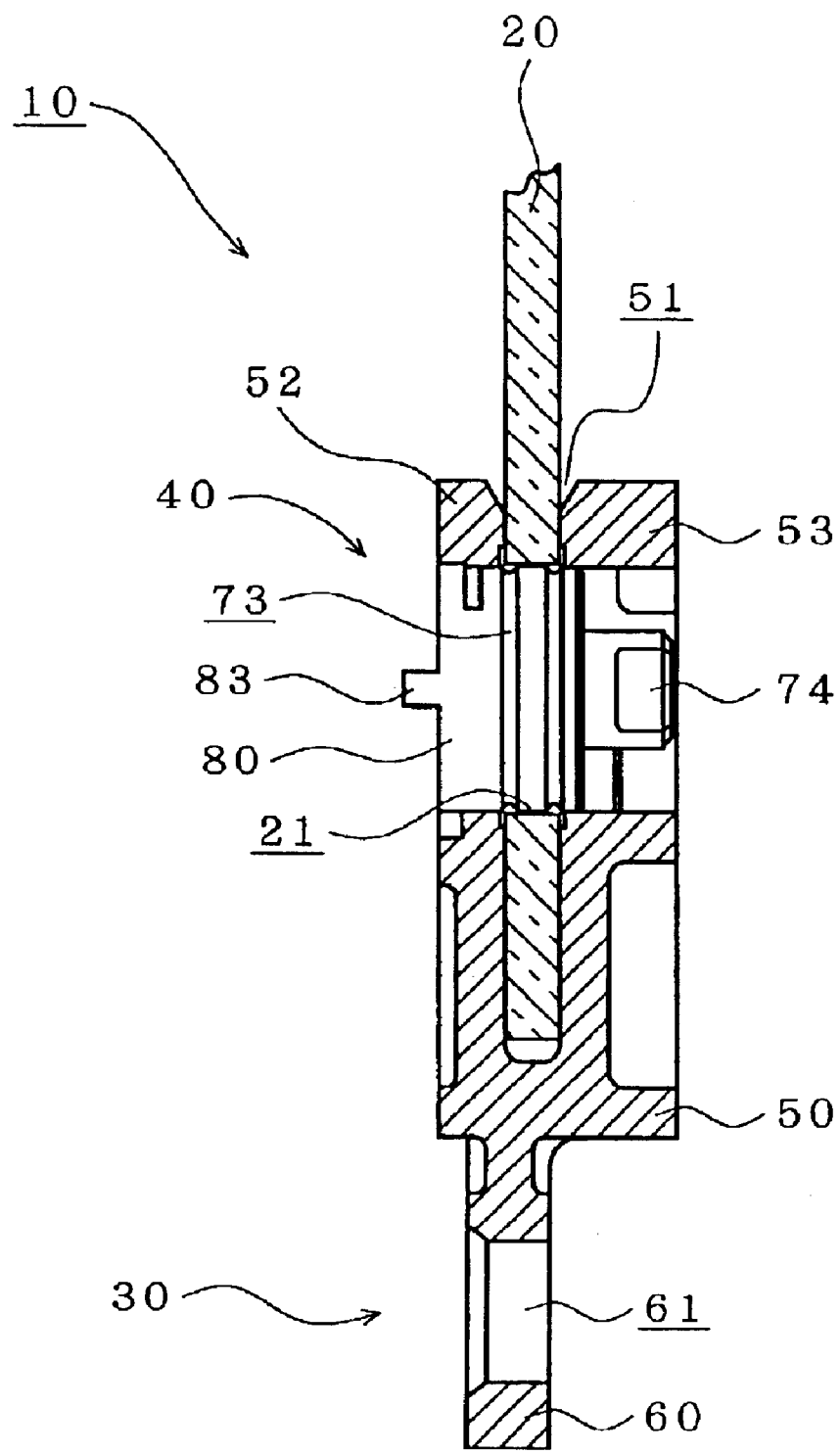
FIG. 16 is a vertical sectional view of the holder set at a locking position of the shaft.

As shown in FIG. 8, a recessed groove 73 is provided on the outer peripheral surface of the shaft main body 80. The recessed groove 73 is, as shown in FIG. 16, disposed oppositely to the inner peripheral edge of the through-hole 21 of the window glass 20. The recessed groove 73 is, as shown in FIG. 8, recessed semicircularly in section from the outer peripheral surface of the shaft main body 80, and formed in a ring shape. As shown in FIG. 16, two recessed grooves 73 are provided so as to be aligned with the inner peripheral edge of the through-hole 21 of the window glass.

Figure 9:
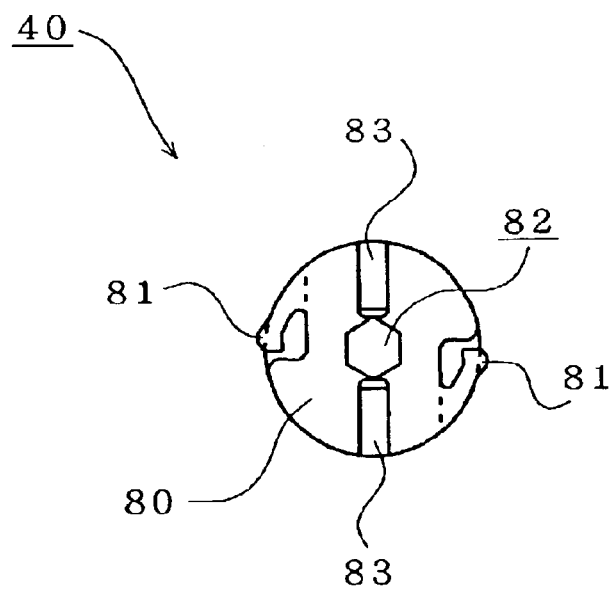
FIG. 9 is a left side view of the shaft.
Figure 10:
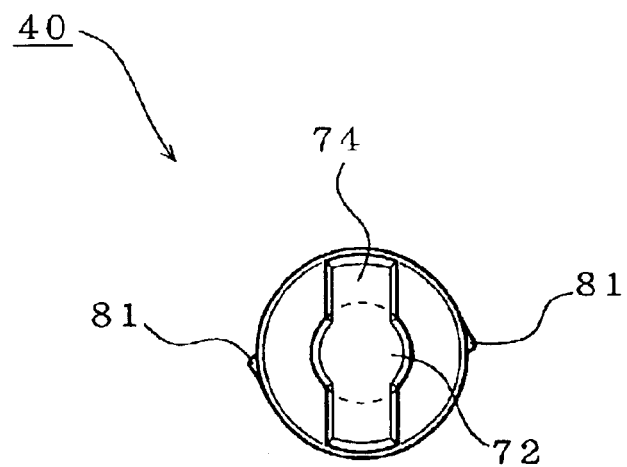
FIG. 10 is a right side view of the shaft.
Figure 11:
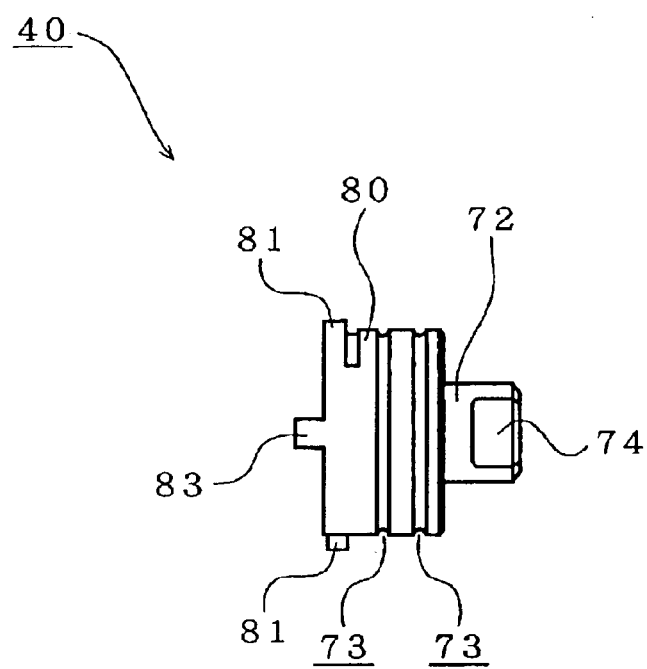
FIG. 11 is a plan view of the shaft.

At the end of the shaft main body 80 opposite to the support portion 72, elastic pieces 81, a jig fitting portion 82 and knobs 83 are provided. Two elastic pieces 81 are, as shown in FIG. 9, spirally bulged out from the outer periphery of the main body 80, respectively. These two elastic pieces 81 are provided in positions symmetrical to each other.

The jig fitting portion 82 is, as shown in FIG. 9, a recess to be fitted with a jig for rotating the shaft 40, for example, a hexagonal wrench, not shown. The case of using the hexagonal wrench as the jig is taken as an example. However, the jig is not limited to such hexagonal wrench, and a driver or the like can be used.

As shown in FIGS. 8 and 9, two knobs 83 are protruded in the axial direction of the main body 80, and radially extended in two directions around the jig fitting portion 82. By holding the knobs 83, the shaft 40 can be inserted into the holding member 30, or conversely the shaft 40 can be extracted from the holding member 30. The knobs 83 can also be used to rotate the shaft 40.

Although both the jig fitting portion 82 and the knobs are provided in the above-described example, only the jig fitting portion may be provided with the knobs being omitted.

Next, the structure of the holding member 30 will be described. As described above, the holding member 30 includes the main body 50 and the connecting portion 60.

As shown in FIGS. 1 to 3, the holding member main body 50 has a pair of opposing pieces 52 and 53, and is formed in a U-shape having its upper part opened. Between these pieces 52 and 53, the above-described window glass inserting portion 51 is formed.

Figure 4:
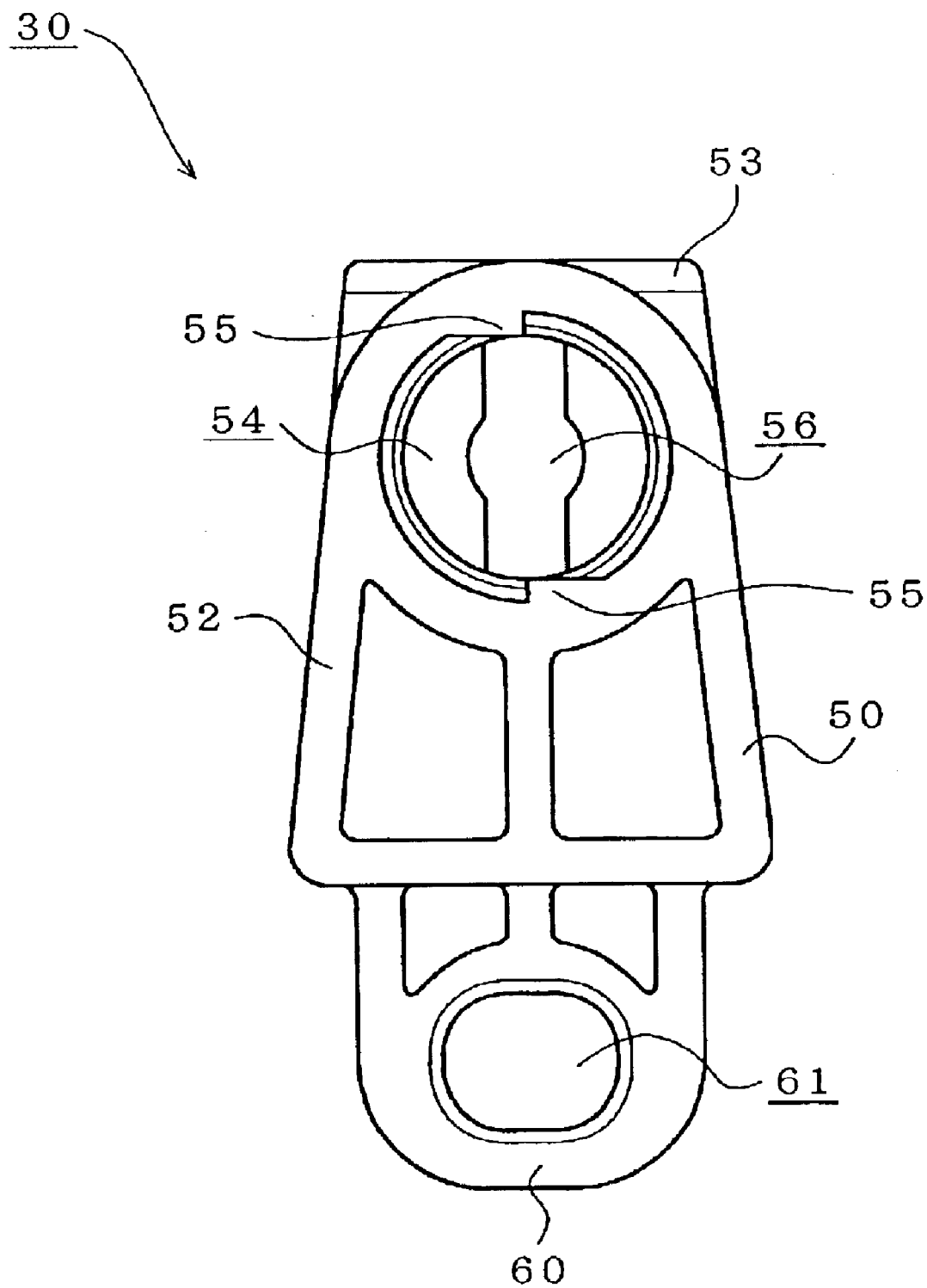
FIG. 4 is a left side view of the holding member.
Figure 6:
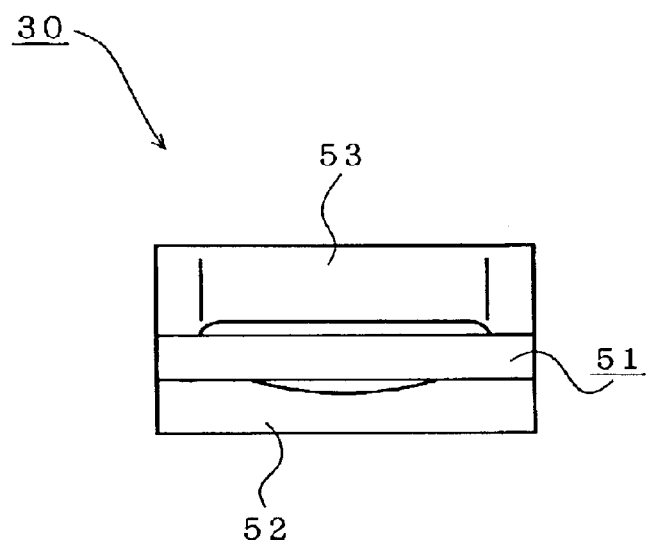
FIG. 6 is a plan view of the holding member.
Figure 7:
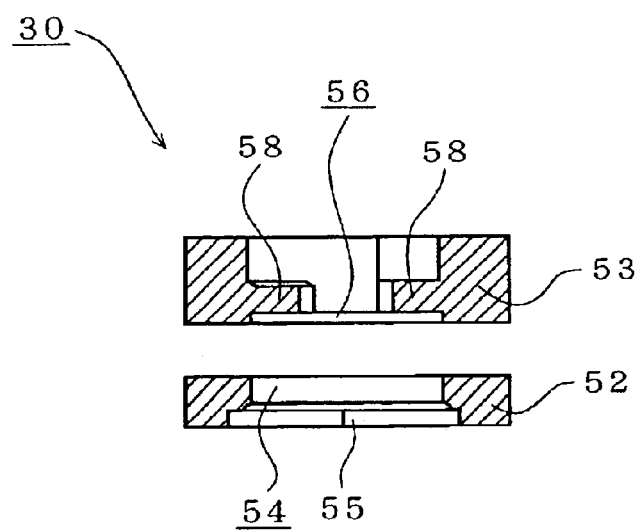
FIG. 7 is a transverse sectional view of the holding member.

As shown in FIGS. 3 and 4, one of opposing pieces 52 and 53, that is, the piece 52, has an shaft inserting hole 54. The shaft inserting hole 53 is formed so as to be circular, and has an inner diameter larger than the outer diameter of the main body 80 of the shaft 40. In the inner peripheral surface of the hole 54, two tapered steps 55 are provided in positions symmetrical to each other. Each of the tapered steps 55 is formed so as to be gradually higher toward the rotational direction of the shaft 40.

As shown in FIGS. 3 and 5, the other of opposing pieces 52 and 53, that is, the piece 53, has an shaft inserting hole 56. The two projecting pieces 74 and the support portion 72 of the shaft 40 can be inserted into the hole 56. For this purpose, the hole 56 has a part for the passage of the support portion, and a part for the passage of each of the two projecting pieces. Around the hole 56, as shown in FIG. 5, two stoppers 58 are provided at positions symmetrical to each other.

The connecting portion 60 is connected to a window regulator mechanism (not shown). As shown in FIGS. 3 to 5, the connecting portion 60 is extended from the holding member main body 50, and has an attaching hole 61.

Next, description will be made of a method of holding the window glass 20 using the holder 10 constructed in the foregoing manner, with reference to FIGS. 12 to 16.

The window glass 20 to be held by the holder 10 includes, as shown in FIGS. 1 and 2, a through-hole 21 having an inner diameter slightly larger than the outer diameter of the shaft main body 80. As shown in FIG. 16, the part of the window glass 20 having the through-hole 21 is inserted into the portion 51 of the holding member 30. In this case, the through-hole 21 of the window glass 20 is aligned with the shaft inserting holes 54 and 56 of the holding member 30. Then, as shown in FIG. 16, the shaft 40 is inserted passing through the hole 54 of the holding member 30 toward the hole 56. At this time, as shown in FIG. 13, the projecting pieces 74 of the shaft 40 are aligned with the hole 56 provided in the opposing piece 53 of the holding member 30. Lastly, as shown in FIGS. 14 and 15, by inserting the hexagonal wrench into the jig fitting portion 82 and rotating it, or gripping the knobs 83 and rotating them by hand, the shaft 40 is rotated by 90° to a locking position.

Accordingly, the projecting pieces 74 of the shaft 40 are engaged with the peripheral part of the hole 56 provided in the opposing piece 53 of the holding member 30, and are abutted to the stoppers 58, thereby preventing the shaft 40 from being rotated any further. As a result, the shaft 40 cannot be extracted from the holding member 30 and, as shown in FIG. 16, the window glass 20 is fixed in the portion 51 of the holding member 30 by the shaft 40.

In this case, each of the inner peripheral edges of the through-hole 21 of the window glass 30 is placed oppositely to one of the two recessed grooves 73 provided on the outer periphery of the main body 80 of the shaft 40. Thus, when a load is applied to the window glass, there is no possibility of window glass breakage because of no forces applied to the inner peripheral edges of the through-hole 21.

Figure 14:
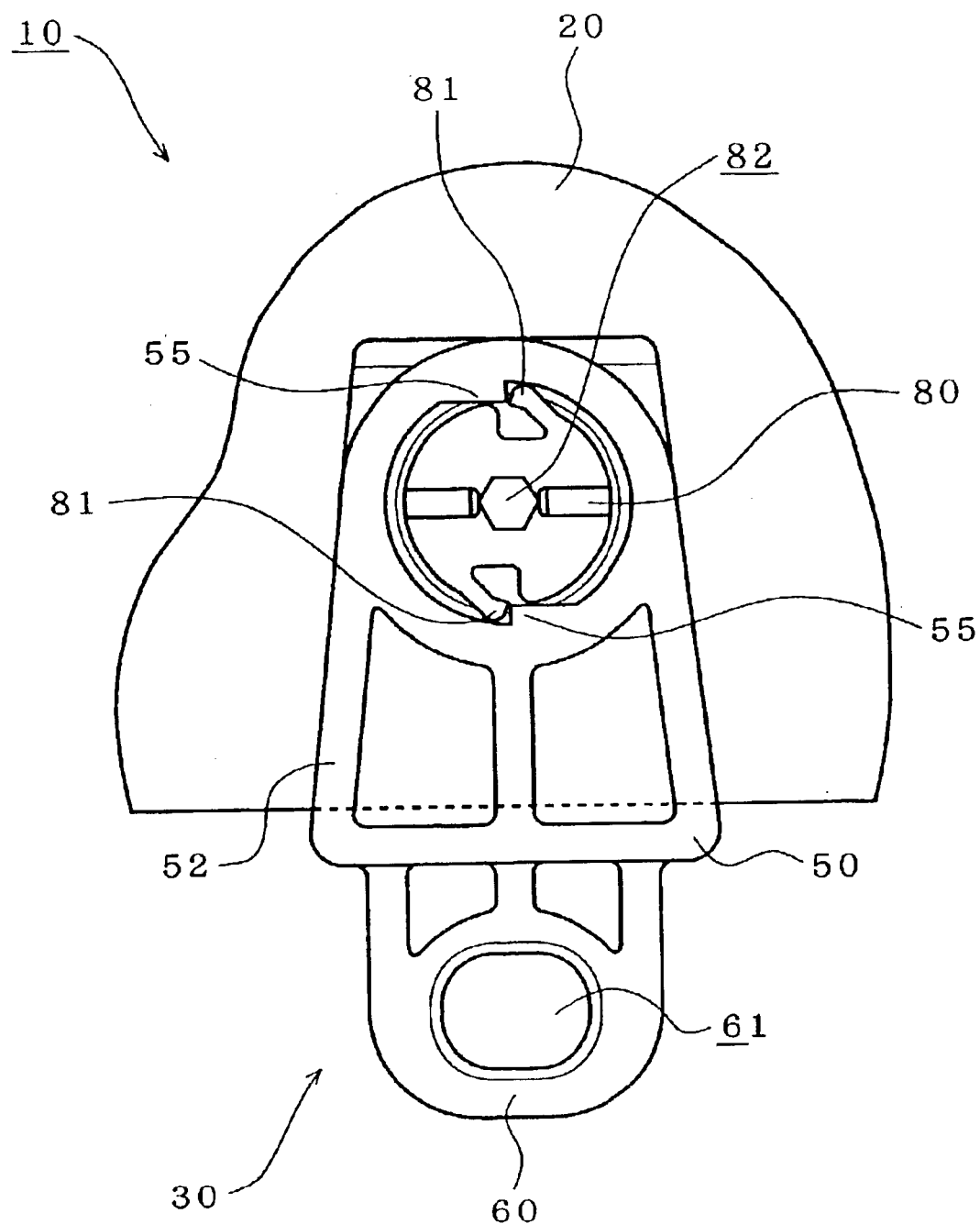
FIG. 14 is a left side view of the holder set at a locking position of the shaft corresponding to FIG. 12.

In addition, when the shaft 40 is rotated, as shown in FIGS. 12 and 14, each of the two elastic pieces 81 provided at the end of the shaft main body 80 slides along the inner peripheral surface of the hole 54, and runs on one of the two tapered steps 55 while being bent. As a result of the returning of the elastic pieces 81 after going over the tapered steps, the elastic pieces 81 are locked with the tapered steps 55, respectively. Accordingly, the reverse rotation of the shaft 40 can be prevented.

On the other hand, when the window glass 20 is removed from the holder, as shown in FIG. 13, the shaft 40 is reversely rotated, and the projecting pieces 74 are aligned with the shaft inserting hole 56 provided in the opposing piece 53 of the holding member 30. Then, by gripping the knobs 83 of the shaft 40, the shaft is extracted from the shaft inserting holes 54 and 56 of the holding member 30. Thus, the window glass 20 can be extracted from the portion 51 of the holding member 30.

Figure 17:
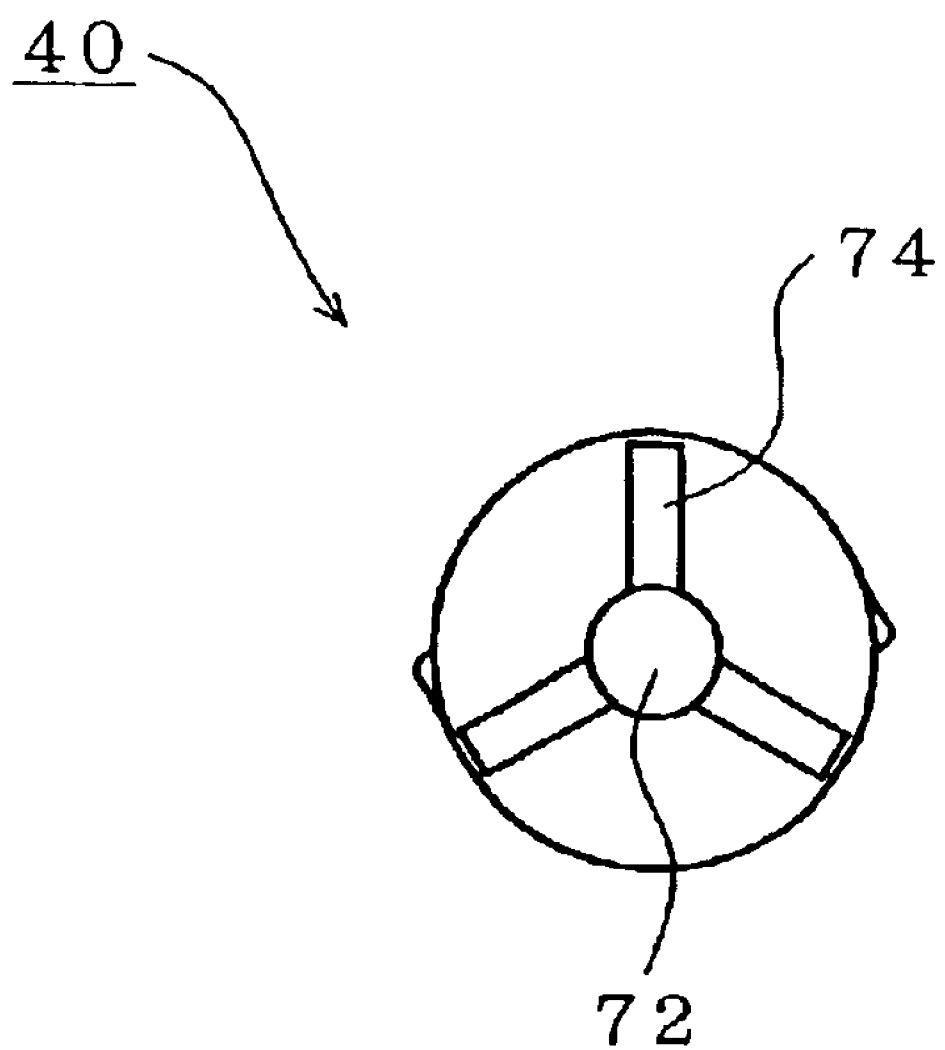
FIG. 17 is a right side view of the shaft, showing another example of a projecting piece structure.

In the extraction preventing mechanism of the described embodiment, each of the projecting pieces has a rectangular parallelepiped shape. However, no limitation is placed in this regard, and any shape can be employed as long as it can be engaged with the peripheral part of the shaft inserting hole. In addition, the number of projecting pieces is not limited to two. FIG. 17 is a side view of the shaft 40, showing an example where the number of projecting pieces is three. Three projecting pieces 74 each formed in the rectangular parallelepiped shape are radially extended in three directions from the outer peripheral surface of the tip of the support portion 72.

In addition, in the extraction preventing mechanism of the described embodiment, the projecting pieces are provided on the tip of the shaft. Conversely, projecting pieces may be provided in the shaft inserting hole 56, and a hole to be engaged with the projecting pieces may be provided on the tip of the shaft. In such a case, stoppers may also be provided on the peripheral part of the hole.

(Second Embodiment)

Next, description will be made of a holder according to a second embodiment of the present invention. The first embodiment is directed to the reverse-rotation preventing mechanism based on the locking of the elastic piece 81 provided at the end of the shaft 40 with the tapered step 55 provided on the inner peripheral surface of the shaft inserting hole 54 of the holding member main body.

The second embodiment is directed to a reverse-rotation preventing mechanism based on the locking of an elastic piece protruded from each of projecting pieces provided at the tip of the shaft with a recess provided at the peripheral part of the shaft inserting hole 56 of the holding member main body.

Figure 19:
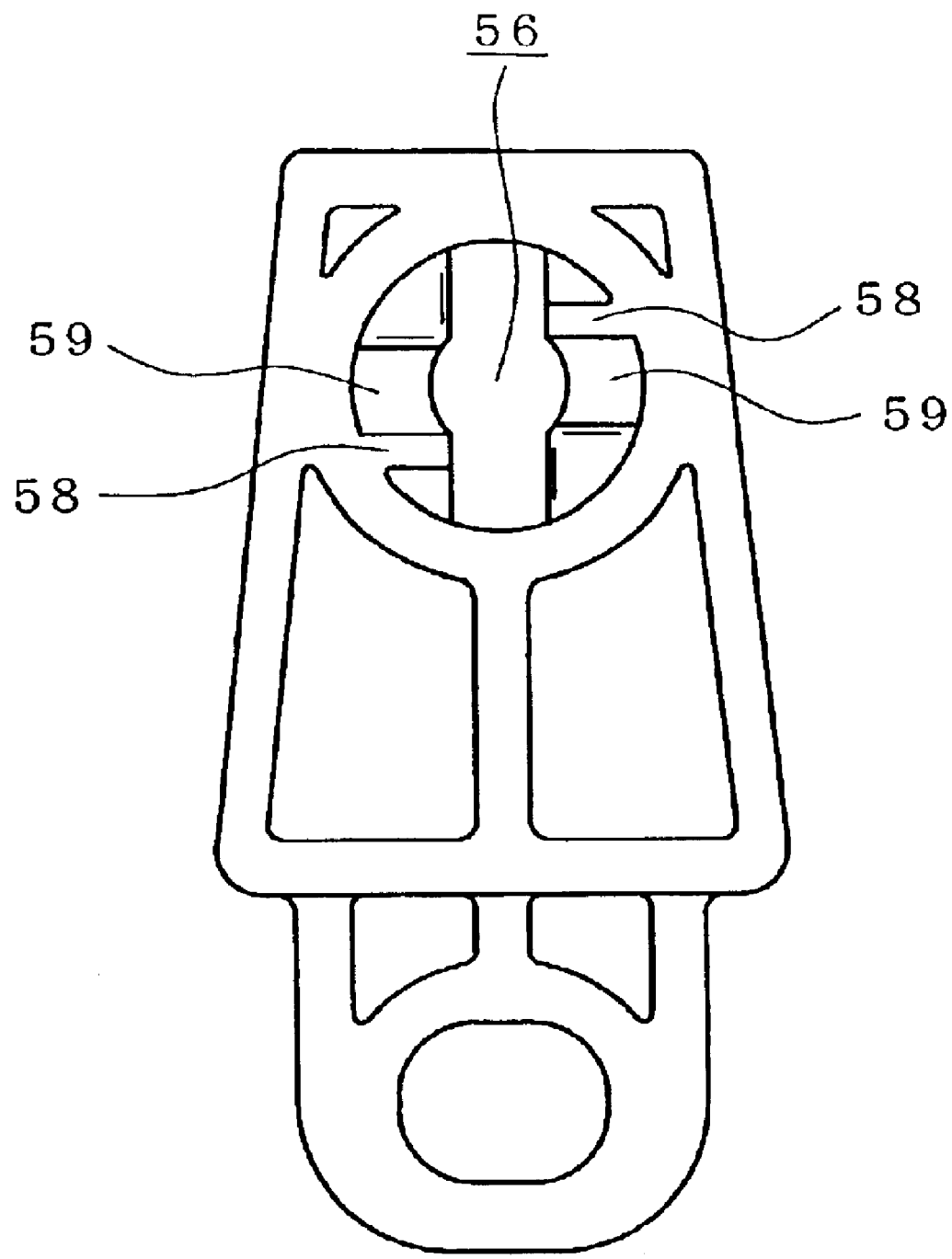
FIG. 19 is a right side view of a holding member of the second embodiment.

FIG. 18 is an exploded perspective view illustrating the holder of the second embodiment, and FIG. 19 a right side view of the holding member. An elastic piece 75 is integrally formed on a projecting piece 74 provided at the tip of the shaft 40, the elastic piece being opposed to the shaft member main body 80. Needless to say, an elastic piece is also integrally formed on another projecting piece 74, not shown.

As shown in FIG. 18, the shaft 40 is inserted so as to set the projecting piece 74 in a vertical position. When the inserted shaft 40 is rotated toward a locking position, the elastic piece 75 is pressed from its base part by the peripheral part of the shaft inserting hole 56. When the shaft 40 is further rotated, the tip of the elastic piece 75 enters a recess 59 provided at the peripheral part of the shaft inserting hole 56, and is locked. Simultaneously, the projecting piece 74 is abutted to the stopper 58 to prevent the shaft 40 from being rotated any further.

On the other hand, when the window glass 20 is removed from the holder, the shaft 40 is reversely rotated, the projecting pieces 74 are aligned with the shaft inserting hole 56, and the shaft 40 is extracted. Then, the window glass 20 can be removed.

In addition, as shown in the figure, the tip of the elastic piece 75 and the entry side of the recess 59 are properly curved. Accordingly, unlocking can be easily implemented by reversely rotating the shaft 40.

(Third Embodiment)

Next, description will be made of a third embodiment of the present invention by referring to FIGS. 20 and 21.

Figure 20:
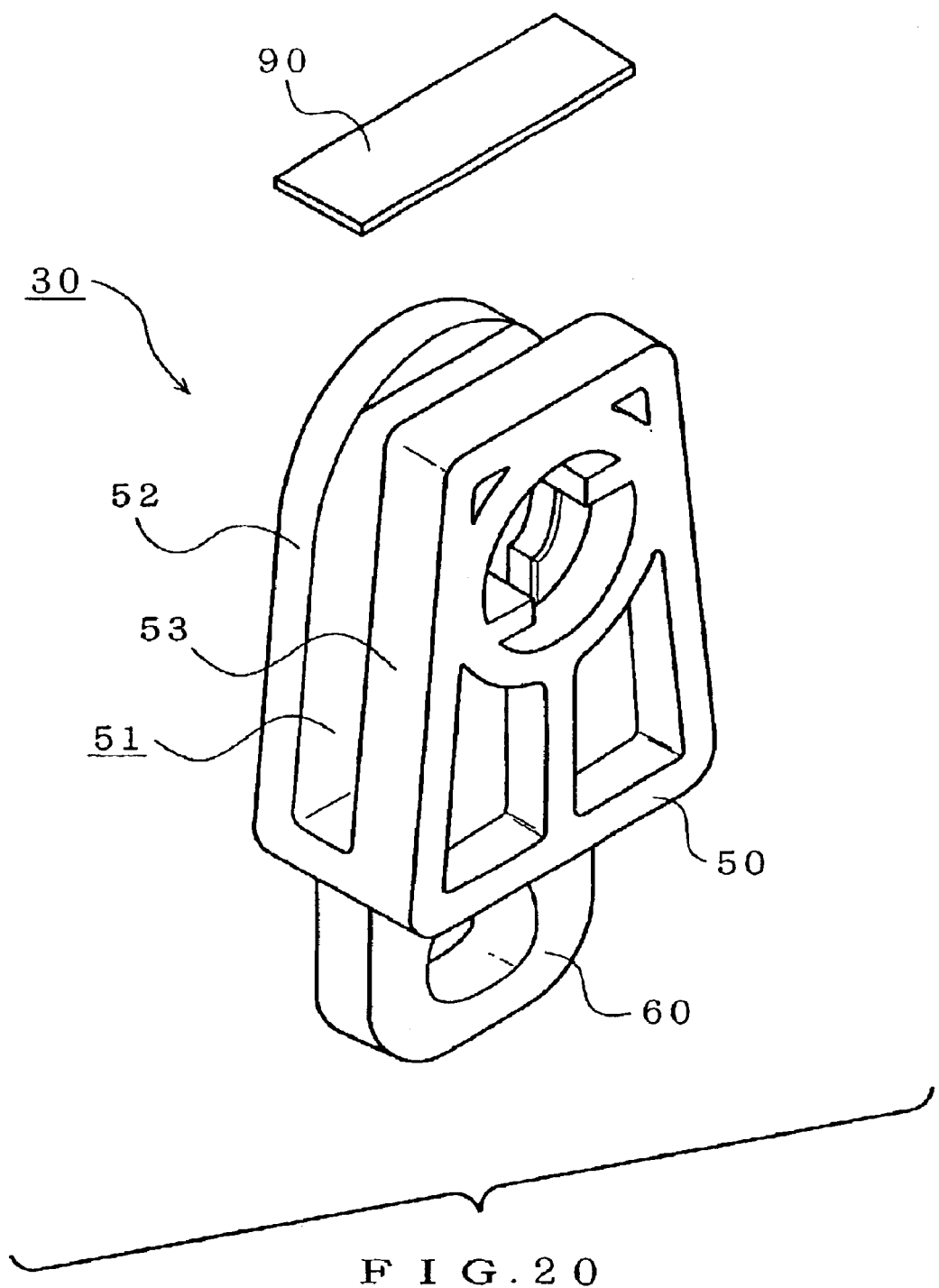
FIG. 20 is a perspective view of a holding member and a buffer member in a third embodiment of the invention.

According to the embodiment, as shown in FIGS. 20 and 21, a buffer member 90 is fixed to the bottom surface of the window glass inserting portion 51 of the holding member 30. As shown in FIG. 20, the buffer member 90 is sheet-shaped. A horizontal width of the buffer member 90 is set so as to be larger than the width of the window glass inserting portion 51. A total length of the buffer member 90 is set so as to be equal to or lower than the length of the portion 51. A felt sheet material, for example, can be used for the buffer member 90. The material of the buffer member 90 is not limited to such felt, and rubber or sponge may be used.

When the buffer member 90 is inserted into the window glass inserting portion 51, as shown in FIG. 21, the buffer member 90 is bent in a U-shape along the bottom surface of the portion 51. Accordingly, even when a force is applied from the bottom of the portion 51 to the lower end of the window glass, there is no possibility of window glass breakage because of the presence of the buffer member.

(Fourth Embodiment)

Next, description will be made of a fourth embodiment of the present invention by referring to FIGS. 22 and 23. According to the embodiment, as shown in FIGS. 22 and 23, a holding member 100 includes a connecting portion 120 to be connected to the connecting member 140 of an elevating/lowering device (not shown) by using a shaft 130.

Figure 22:
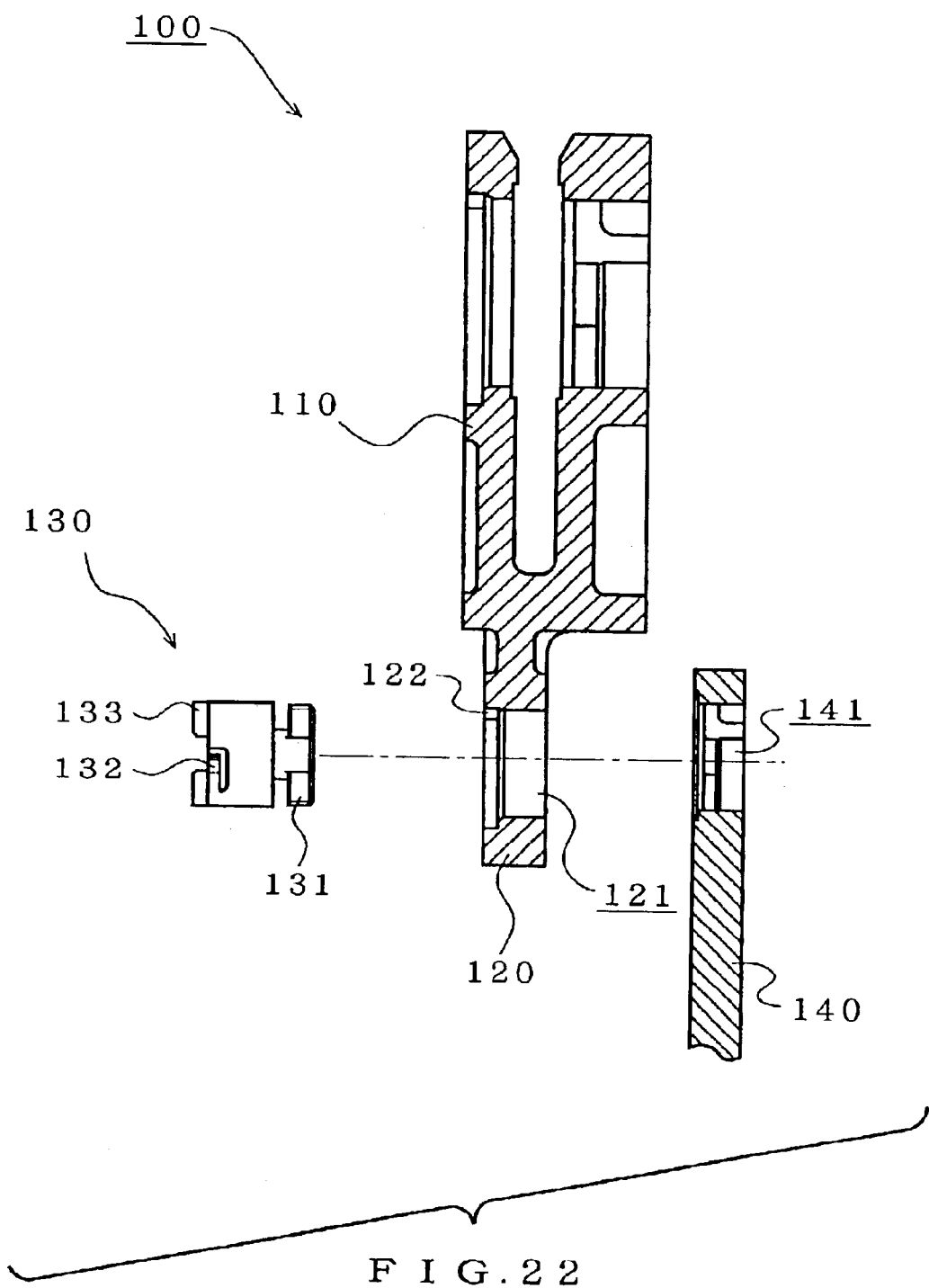
FIG. 22 is a sectional view of a holding member, a shaft and a connecting member in a fourth embodiment of the invention.

As shown in FIG. 22, the holding member 100 is composed of a main body 110 similar to the holding member main body 50 of the first embodiment, and the above-described connecting portion 120. In the connecting portion 120, as shown in FIG. 22, an attaching hole 121 is provided. The attaching hole 121 has a structure similar to that of the shaft inserting hole 54 (see FIG. 2) of the first embodiment. This attaching hole 121 has tapered steps 122.

The shaft 130 also has a structure similar to that of the shaft 40 (see FIGS. 1 and 2) of the first embodiment. As shown in FIG. 22, the shaft 130 includes projecting pieces 131, elastic pieces 132, and knobs 133.

As shown in FIG. 22, the connecting member 140 includes a connecting hole 141. This connecting hole 141 also has a structure similar to that of the shaft inserting hole 56 (see FIGS. 1 and 2) of the first embodiment.

According to the embodiment, by rotating the shaft 130 after its insertion, as shown in FIG. 23, the holding member 100 and the connecting member 140 can be connected to each other with one operation.

(Fifth Embodiment)

Next, description will be made of a fifth embodiment of the invention by referring to FIGS. 24 to 26.

According to the embodiment, as shown in FIG. 24, a holding member 200 includes a plurality of, for example two, connecting portions 220 and 230 for connection with an elevating/lowering device (not shown). As shown in FIG. 24, the two connecting portions 220 and 230 include attaching holes 221 and 231, respectively.

A plurality of, for example two, through-holes 21 and 22 are generally provided in the window glass 20 as shown in FIG. 25. Though not shown, two holder are respectively attached to these two through-holes, and each connecting portion of the holding member of each holder is connected to the elevating/lowering device.

Figure 26:
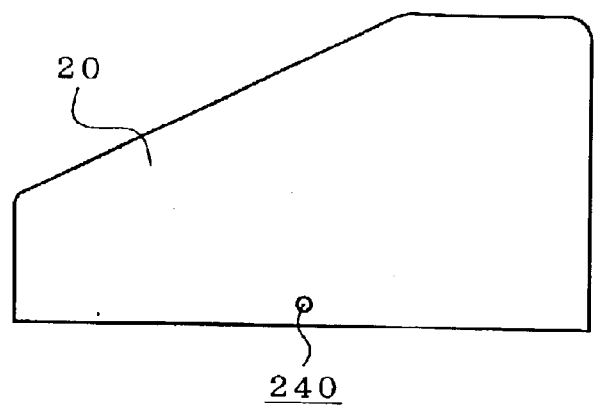
FIG. 26 is a side view of another window glass.

On the other hand, when the holding member 200 of the embodiment is used, it is only necessary to provide one through-hole 240 in the window glass 20 as shown in FIG. 26. Then, though not shown, the holding member 200 is attached to one through-hole 240, and the two connecting portions 220 and 230 of the holding member 200 can be respectively connected to the elevating/lowering device.

According to the embodiment, a boring work for the window glass 20 can be reduced. Moreover, the number of part items can be reduced, making it possible to reduce the work of attaching the holding member 200 to the window glass 20. As a result, it is possible to reduce the effects of variance in the boring work or variance in the manufacturing or attaching work of the holding member 200.

(Sixth Embodiment)

Figure 27:
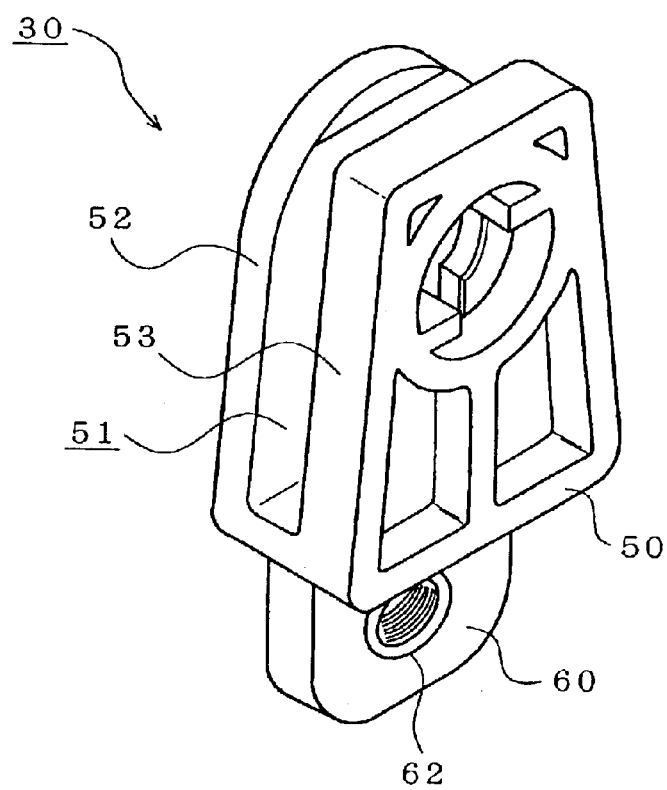
FIG. 27 is a perspective view of a holding member in a sixth embodiment of the invention.

Next, description will be made of a sixth embodiment of the invention by referring to FIG. 27. According to the embodiment, a metallic female screw 62 is buried in the attaching hole of the connecting portion 60 of the holding member. The connecting portion 60 having such female screw is fixed by a screw to the connecting member of the elevating/lowering device.

The present invention has been illustrated and described with reference to the certain embodiments. According to the holder of the present invention, the window glass can be easily fixed only by rotating the shaft. Moreover, the shaft can be easily extracted by reversely rotating the shaft, and the holder can be reused. Furthermore, the window glass may be reused itself and recycled as cullet, because the holder may be easily detached from the window glass.

INDUSTRIAL APPLICABILITY

The holder according to the present invention may connect the window glass of an automobile to a window regulator mechanism incorporated in a door, and be elevated/lowered while holding the window glass.

What is claimed is:

1. A vehicle window glass holder comprising:
   a holding member for holding a vehicle window glass having a through-hole provided therein;
   a shaft for fixing the window glass to the holding member; and
   an extraction preventing mechanism for preventing the shaft from being extracted when the shaft is rotated
   wherein:
   the shaft includes projecting pieces provided on its tip, a support portion for supporting the projecting pieces, and a main body connected to the support portion,
   the holding member integrally formed and includes a pair of opposing pieces forming therebetween a portion into which the window glass is inserted, one of opposing pieces having a first hole into which the main body of the shaft is inserted, the other of opposing pieces having a second hole into which the projecting pieces and support portion are inserted,
   the shaft is inserted from the first hole of one of opposing pieces through the through-hole of the window glass to the second hole of the other of opposing pieces so as to hold the window glass by the main body, and
   the extraction preventing mechanism prevents the shaft extraction upon engagement between the projecting pieces and a peripheral part of the second hole of the other of opposing pieces caused by rotation of the shaft.

2. A vehicle window glass holder according to claim 1, further comprising a reverse-rotation preventing mechanism provided at an end of the main body of the shaft and in the first hole of one of opposing pieces for preventing reverse rotation of the shaft when the shaft is rotated.

3. A vehicle window glass holder according to claim 2, wherein the reverse-rotation preventing mechanism includes elastic pieces provided at the end of the main body, and tapered steps provided at an inner peripheral surface of the first hole of one of opposing pieces, and functions based on locking of the elastic pieces to the tapered step caused by rotation of the shaft.

4. A vehicle window glass holder comprising:
   a unitary shaft for fixing the window glass to a holding member, the shaft including projecting pieces provided on its tip, a support portion for supporting the projecting pieces, and a main body connected to a support portion;
   the holding member for holding a vehicle window glass having a through-hole provided therein, the holding member being integrally formed and including a pair of oppposing pieces forming therebetween a portion into which the window glass is inserted, one of opposing pieces having a first hole into which the main body of the shaft is inserted, the other of opposing pieces having a second hole into which the projecting pieces and the support portion of the shaft are inserted;
   a extraction preventing mechanism for preventing the shaft from being extracted when the shaft is rotated; and
   a reverse-rotation preventing mechanism provided at the projecting pieces and a peripheral part of the second hole of the other of opposing pieces for preventing reverse rotation of the shaft when the shaft is rotated;
   wherein the shaft is inserted from the first hole of one of opposing pieces through the through-hole of the window glass to the second hole of the other of opposing pieces so as to hold the window glass by the main body.

5. A vehicle window glass holder according to claim 4, wherein the reverse-rotation preventing mechanism includes elastic pieces provided on the projecting piece and recesses provided at the peripheral part of the second hole of the other of opposing pieces, and functions based on locking of the elastic pieces to the recesses caused by rotation of the shaft.

6. A vehicle window glass holder according to claim 2 or 4, wherein an end of the main body of the shaft has a structure for rotating the shaft.

7. A vehicle window glass holder according to any one of claims 1 or 2–5, wherein at a outer peripheral surface of the main body of the shaft, two recessed grooves are provided each thereof is oppositely to and away from an inner peripheral edge of the through-hole of the window glass.

8. A vehicle window glass holder according to any one of claims 1 or 2–5, wherein a buffer member is fixed to the bottom surface of the portion of the holding member into which the window glass is inserted.

9. A vehicle window glass holder according to any one of claims 1 or 2–5, wherein the holding member further includes at least one connecting portion to be connected to an elevating/lowering device for elevating/lowering the window glass.

10. A vehicle window glass holder according to claim 9, wherein a female screw is provided in the connecting portion.

* * * * *